United States Patent
Li et al.

(10) Patent No.: US 8,443,374 B2
(45) Date of Patent: May 14, 2013

(54) BUSINESS APPLICATION INTEGRATION ADAPTERS MANAGEMENT SYSTEM

(75) Inventors: Wenhua Li, Palo Alto, CA (US); Sudesh Kamath, Fremont, CA (US); Jianbo Liu, Shenzhen (CN)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 12/877,093

(22) Filed: Sep. 7, 2010

(65) Prior Publication Data

US 2012/0030689 A1 Feb. 2, 2012

(51) Int. Cl.
*G06F 3/00* (2006.01)
*G06F 9/46* (2006.01)

(52) U.S. Cl.
USPC ............................ 719/310; 719/100; 719/106

(58) Field of Classification Search .................. 719/318, 719/310; 718/10, 106
See application file for complete search history.

(56) References Cited

U.S. PATENT DOCUMENTS

| | | | |
|---|---|---|---|
| 6,256,676 B1 | 7/2001 | Taylor et al. | |
| 7,003,773 B2 | 2/2006 | Hoennig et al. | |
| 7,130,891 B2* | 10/2006 | Bernardin et al. | 709/218 |
| 7,152,094 B1* | 12/2006 | Jannu et al. | 709/206 |
| 7,171,206 B2* | 1/2007 | Wu | 455/438 |
| 7,499,899 B2 | 3/2009 | Siegel et al. | |
| 7,590,759 B2* | 9/2009 | Omar et al. | 709/246 |
| 7,596,083 B2* | 9/2009 | Klos et al. | 370/216 |
| 7,650,325 B2 | 1/2010 | Bader et al. | |
| 8,146,095 B2* | 3/2012 | Gale et al. | 719/313 |
| 2002/0116454 A1 | 8/2002 | Dyla et al. | |
| 2003/0033346 A1* | 2/2003 | Carlson et al. | 709/104 |
| 2004/0167986 A1 | 8/2004 | Gilfix et al. | |
| 2006/0013235 A1* | 1/2006 | Farnham | 370/401 |
| 2007/0198988 A1 | 8/2007 | Kumar et al. | |
| 2008/0157805 A1* | 7/2008 | Kushnick et al. | 324/763 |
| 2009/0172163 A1* | 7/2009 | Carroll et al. | 709/226 |
| 2010/0169457 A1* | 7/2010 | Kinoshita et al. | 709/219 |

OTHER PUBLICATIONS

S.Pangoli, Automatic Generation of Task-oriented Help, 11, 1995.*
"Integration Manager"—Microsoft Great Plains Business Solutions, obtained at http://www.bretabennett.com/dynamics/Docs_Dyn_v6_v7/Customization/IMFactSheet.pdf, copyright 2001, 6 pages.

* cited by examiner

*Primary Examiner* — Lechi Truong
(74) *Attorney, Agent, or Firm* — Trellis IP Law Group, PC

(57) ABSTRACT

In an example embodiment, a system manages adapters and connectors used to integrate software applications. The example system includes a repository of connectors, where each connector includes one or more integration adapters. A connector generator communicating with the repository of connectors is adapted to selectively generate one or more connectors in response to detection of an event for which a corresponding connector is not found in the repository of connectors. In a more specific example embodiment, the connector generator is adapted to implement one or more generated connectors as a web service. The connector generator may be constructed in accordance with an Application Integration Architecture (AIA) integration framework. Additional tools are provided for monitoring connector runtime information and receiving and logging user feedback pertaining to connectors.

19 Claims, 6 Drawing Sheets

BUSINESS APPLICATION INTEGRATION ADAPTERS MANAGEMENT SYSTEM

CROSS REFERENCES TO RELATED APPLICATIONS

This application claims priority from Chinese Patent Application Serial No. 201010247624.5, entitled E-Business Suite Integration Adapters Management System, filed on Jul. 29, 2010, which is hereby incorporated by reference as if set forth in full in this application for all purposes

BACKGROUND

The present application relates to application integration and more specifically to systems and methods for facilitating interoperability and/or interconnectivity between technologies, such as different types of software applications.

Systems and methods for facilitating interoperability between software applications are particularly important in enterprise environments (involving Enterprise Application Integration (EAI) implementations) where large businesses often use various different applications, including older legacy applications and third-party applications, which must effectively intercommunicate. For example, a large business may employ different Enterprise Resource Planning (ERP), Customer Relationship Management (CRM), Supply Chain Management (SCM) and other software that must intercommunicate to complete certain tasks.

A business may wish to use a first software application to perform a certain task, but the task may require accessing data or functionality of a second software application. Generally, the first software application may communicate with the second software application via a special translation interface, also called an integration interface, that facilitates translating different types of messages that are employed by the different types of software. When a software application is interfaced with one or more other software applications in a computing environment, the software application is said to be integrated with the other software applications.

To integrate different legacy applications and third-party applications, such as different ERP/CRM applications, which may run on different technology platforms, an Application Integration Architecture (AIA) foundation pack and accompanying adapters may be employed. The included adapters may provide bi-directional and multi-modal synchronous and asynchronous interconnectivity between various applications in an enterprise computing environment.

In certain implementations, it may be unclear how and when various readily available adapters or new adapters should be used to achieve seamless and best performance integration between software applications. Accordingly, solution providers are often hired to build appropriate integration solutions. However, this can be time consuming and costly. Furthermore, the contracted integration solutions may be redundant and may result in different solutions that use different or incompatible approaches, i.e., the contracted solutions may lack implementation consistency. In addition, further changes or updates to business software suites or computing architectures may require additional construction of potentially costly integration solutions.

SUMMARY

An example integration adapters management system for managing adapters and connectors for integrating software applications includes a repository of connectors. Each of the connectors includes one or more integration adapters. A connector generator communicates with the repository of connectors and is adapted to selectively generate one or more connectors in response to detection of an event for which a corresponding connector is not found in the repository of connectors.

In a more specific example embodiment, the connector generator is adapted to implement one or more generated connectors as a web service. The connector service may be constructed in accordance with an Application Integration Architecture (AIA) integration framework.

The example system further includes a connector monitor for monitoring runtime information associated with a connector and providing runtime information in response thereto. A feedback system maintains feedback information pertaining to the operation of one or more connectors of the repository of connectors. One or more user interface modules facilitate enabling a user to provide feedback to the feedback system and to view runtime information provided by the connector monitor. A search engine is adapted to facilitate enabling a user to employ the one or more user interfaces to perform a search of the repository of connectors for a desired connector. An introspection system facilitates detecting custom or extended adapters in the repository of connectors and provides an indication in response thereto to the one or more user interface modules.

Certain embodiments disclosed herein may facilitate automatic generation of connectors and adapters to facilitate integrating software applications of an enterprise or other organization. Automatic generation of connectors based on connector metadata may improve consistency of generated connectors and may facilitate avoiding creating redundant connectors. Furthermore, such functionality may facilitate transitions to new technologies, since generated connectors may be automatically regenerated or updated as enterprise computing environments change.

Various tools, such as a feedback user interface, a searchable connector repository, and a connector runtime monitor facilitate managing when and how connectors are generated and used and further facilitate determining the best connector(s) to use in a given situation.

A further understanding of the nature and the advantages of particular embodiments disclosed herein may be realized by reference of the remaining portions of the specification and the attached drawings.

DETAILED DESCRIPTION OF EMBODIMENTS

Figure 1:
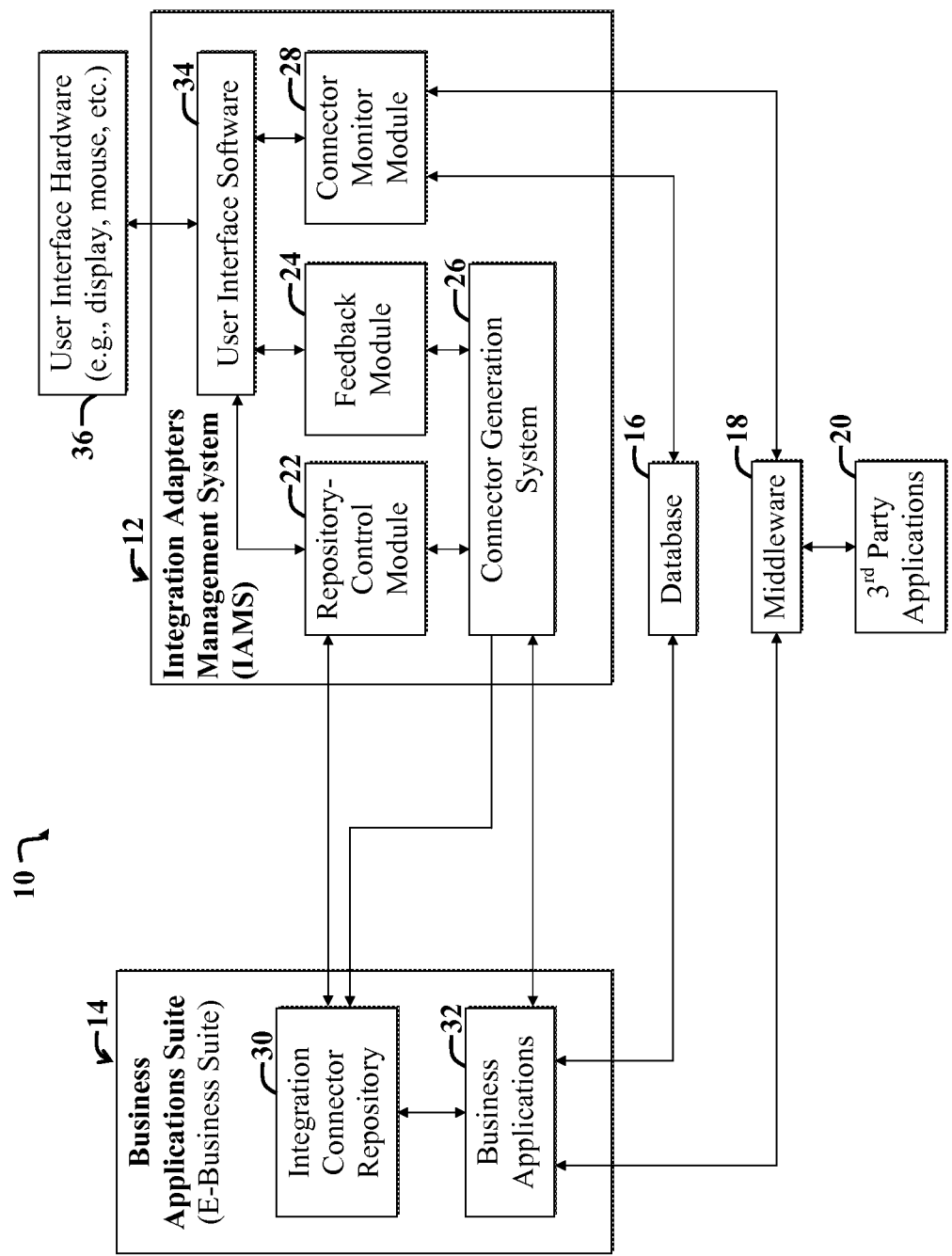
FIG. 1 is a diagram illustrating a first example embodiment of a system for facilitating management and control of software integration functionality.

Although the description has been described with respect to particular embodiments thereof, these particular embodiments are merely illustrative, and not restrictive.

For example, while certain embodiments are discussed herein with respect to implementations involving use of an E-business suite of software applications, embodiments are not limited thereto. For example, any Enterprise Application Integration (EAI) framework that employs various adapters to facilitate interfacing different applications may benefit from the ability to search adapters, generate connectors incorporating adapters, monitor adapters, and to log feedback pertaining to adapters and connectors in accordance with certain embodiments disclosed herein.

For the purposes of the present discussion, an application, such as a software application, may be any set of computer-readable instructions adapted to perform one or more functions or tasks or groups thereof. A first application is said to be interfaced with or integrated with a second software application and vice versa if communications between the first application and the second application are enabled via an interface. An example interface includes an adapter or collection of adapters (e.g., a connector) that translates a first type of specific message from the first application into a generic message and then translates the generic message to a second type of specific message readable by the second software application. The connector may also translate the second specific type of message to the first specific type of message via intermediate translation to the generic type of message. Note that if the first application or the second application is adapted to read the generic message, one or more message-conversion steps may be omitted. A generic message type may be a type of message used to translate between various different types of messages. A generic message may be used as an intermediate message during an interfacing process. Furthermore, note that certain software applications that can read the generic message type may not require additional translation between generic messages and different specific messages used by the software applications.

In general, Enterprise Application Integration (EAI) involves facilitating interaction between different applications, processes, systems, and technologies. EAI may be visualized as an integration framework used to integrate computing resources across an enterprise. Examples of such computing resources include Supply Chain Management (SCM) applications (e.g., for managing inventory and shipping), Customer Relationship Management (CRM) applications (e.g., for managing current and potential customers), Business Intelligence (BI) applications (e.g., for finding patterns from existing data from operations), and other types of applications. Such applications may lack built in mechanisms for communicating with each other. Accordingly, absent integration, the applications may not be able to share data and functionality. Lack of integration and accompanying lack of intercommunicability between applications may lead to inefficiencies. For example, identical data may be stored in multiple locations, or certain process flows involving multiple functions/processes may not be automated.

To integrate software applications, EAI software may be used to link applications within an organization to simplify and automate business processes, while often obviating the need to significantly alter existing applications or data structures. A challenge often faced by EAI systems is that various systems and applications requiring integration often reside on different operating systems, use different database solutions and different computer languages, or include legacy systems.

If integration is applied without following a structured EAI approach, point-to-point connections may grow across an organization, leading to an undesirably complicated web of connections and dependencies. EAI often involves analyzing systems of systems, which may involve large-scale interdisciplinary problems with multiple, heterogeneous, and distributed systems that are embedded in networks at multiple levels.

Generally, EAI systems can be categorized as mediation systems, federation systems, or combinations thereof. A mediation EAI system may act as an interfacing broker between multiple applications to facilitate sharing of data and processes between applications. When an event occurs in an integrated application, e.g., new information is added, a new transaction is completed, etc., an integration module in the EAI system detects the event or is otherwise notified of the event. The integration module then propagates the requisite information or instructions to relevant applications.

A federation EAI system may act as an overarching interfacing facade across multiple applications. In such a system, event calls from one application to another are front-ended by the EAI system, such that the EAI system exposes only relevant information and interfaces of the underlying applications to other applications. Such an EAI system may interface interactions on behalf of a requester application, called a consumer. In general, for every step in an interaction between applications that offer services, i.e., web services, such as in a Service Oriented Architecture (SOA) environment, one of the two services (consumer service) initiates a request and the other service (producer) executes the request. The service that initiates the request is called the consumer service, and the service that executes the request is called the producer service or provider service. The role of a service may change over the course of an interaction.

Mediation and federation may be considered as EAI patterns of the accompanying integration architecture. Such patterns may be employed concurrently in a single EAI system. For example, such an EAI system could be keep multiple applications in sync (mediation), while servicing requests from external users against these applications (federation).

For clarity, certain well-known components, such as hard drives, processors, operating systems, power supplies, routers, and so on, have been omitted from the figures. However, those skilled in the art with access to the present teachings will know which components to implement and how to implement them to meet the needs of a given application.

FIG. 1 is a diagram illustrating a first example embodiment of a system 10 for facilitating management and control of software integration functionality, such as functionality represented by connectors and adapters, as discussed more fully below. The system 10 may be implemented in software running on an enterprise application server. Alternatively, various components of the system 10 may be implemented in a distributed fashion across various different computing resources, such as networks and servers, and not just on a single application server accessible by client systems.

The system 10 includes an integration adapters management system 12 in communication with a suite of software applications 14, such as an E-business suite. For the purposes of the present discussion, an E-business suite may be any collection of software applications adapted to facilitate operations of an enterprise or other organization. The business suite 14 includes an integration connector repository 30 and various business related applications 32 to be integrated with each other and with other applications, such as a database 16 and middleware 18, and applications communicating therewith, such as third party applications 20. For the purposes of the present discussion, a third party application may be any software application that is separate from the business applications 32 included in the suite 14.

The present example integration adapters management system 12 includes a repository-control module 22 in communication with a connector generation system 26 and user interface software 34; a feedback module 24 in communication with the user interface software 34 and the connector generation system 26, and a connector monitor module 28 in communication with the user interface software 34, the database 16, and the middleware 18. Note that while the user interface software 34 is shown as one module, the user interface software 34 may include several modules, such as a repository-control interface, a feedback interface, and a connector monitor user interface module, as discussed more fully below. The user interface software 34 is adapted to enable a user to interact with the integration adapters management system 12 via user interface hardware 36, which may include a display and input devices, such as a mouse, keyboard, etc. For the purposes of the present discussion, a module may be any collection of functionality, which may include one or more machine-executable functions or procedures.

The database module 16 may run on a database server and act as a data warehousing facility for various business applications 32 of the suite 14. The middleware 18 may run on a Service Oriented Architecture (SOA) server and may facilitate further interfacing third party applications 20 with the business applications 32 of the suite 14.

In operation, the business suite 14 includes computer code for implementing an Application Integration Architecture (AIA) enterprise business objects and services layer, which includes functionality provided by an AIA foundation pack, such as the Oracle AIA foundation pack. The connector generation system 26 implements connectors and associated web services in a manner consistent with the AIA functionality provided in the business suite 14.

For the purposes of the present discussion, a service may be any web service, where a web service may be any functionality, such as represented by a program, function, process, or other functionality, that is accessible or otherwise may be activated via a message sent over a network. An example message includes a Uniform Resource Locator (URL) sent over a network via HyperText Transfer Protocol (HTTP). Another example message includes an eXtensible Markup Language (XML) message sent in accordance with Simple Object Access Protocol (SOAP). Web services may be written in various languages, such as Web Services Description Language (WSDL), Java, and so on.

One or more of the business applications 32 of the suite 14 may issue an event, such as to retrieve data from another application, to perform a process using functionality of another application, and so on. The AIA layer underlying the suite 14 facilitates selection of a connector from the integration repository 30 to connect appropriate applications in response to detection of an event. Example connectors include a product connector, invoice connector, account connector, and so on, for facilitating updating product information, invoice information, account information, respectively, in different applications. Various AIA modules, such as Advanced Queue (AQ) event adapters, table/views adapters, Procedural Language Extensions to SQL (PLSQL) adapters, Enterprise Business Organization (EBO) adapters, and so on, may be included to facilitate integration of application data and processes.

If a new software application is being integrated with the business applications 32 of the business suite 14, appropriate connectors must be selected from the repository 30 or otherwise provided to facilitate integration of the relevant commands, processes, parameters and flows to be integrated. A user interested in integrating a software application may employ the user interface software 34 to access functionality of the repository-control module 22. The repository-control module 22 includes a search engine and associated functionality for facilitating searching the integration repository 30 for one or more appropriate connectors to facilitate integration of the software application. Note that search of the integration connector repository 30 may be performed automatically upon detection of an event provided by an application to be integrated, without departing from the scope of the present teachings.

The repository-control module 22 includes a connector metadata repository, as discussed more fully below, that enables a user to employ the user interface software 34 to enter data describing one or more characteristics of one or more connectors that are needed to integrate a particular software application. The connector metadata is accessible by the connector generation system 26. The connector generation system 26 is adapted to employ the metadata to automatically generate one or more appropriate connectors. The connectors are then made available to applications as a connector service. Software code corresponding to the newly generated connectors may be stored in the integration connector repository 30.

In the present embodiment, the connector generation system 26 makes generated connectors available as web services to other applications, such as via an eXtensible Markup Language (XML) gateway coupling the connector generation system 26 to the applications suite 14. The connector generation system 26 includes event adapters for detecting events, including XML calls, API calls, and DB calls coming from the suit of applications 14. In response to the detection of an event, an appropriate connector may be provided by the connector generation system 26 for use in interfacing applications, as discussed more fully below. Note that the connector metadata provided to the connector generation system 26 from the repository-control module 22 may be automatically determined or estimated (instead of manually entered) by AIA functionality included in the suite of applications 14 without departing from the scope of the present teachings.

A given user may describe their experiences or observations involving use of a given connector to perform a particular integration function by employing the user interface software 34 to update a feedback log maintained by the feedback module 24. A user may also rate a connector in accordance with a predetermined rating scale or method. This enable users who employ the repository-control module 22 to select connectors for application integration to view other users' comments, connector ratings, etc., pertaining to particular connectors included in the integration connector repository 30.

When a given connector is run, corresponding connector runtime information may be determined by the database module 16 and/or the middleware 18, depending upon the connector and application(s) being integrated. Typically, the database 16 will maintain runtime information for objects, while the middleware 18 will track runtime information for services. This runtime information is accessible via the connector monitor module 28 and made available to users of the system 10 via the user interface software 34. Connector runtime information may be used to diagnose connector problems and to facilitate informed user feedback provided to the feedback module 24.

For the purposes of the present discussion, middleware may be any software application or collection of applications that is/are adapted to interface communications between one or more different applications.

The connector generation system 26 may also employ information, such as connector ratings, provided via the feedback module 24, to facilitate selecting adapters to include in a particular generated connector. A generated connector may include several adapters to implement a process flow or integration function associated with the connector.

In the present specific embodiment, the connector generation system 26 is specifically adapted for use with the suite of applications 14, which may be implemented via an E-business suite. The connector generation system 26 may be constructed in accordance with a predetermined AIA integration standard and set of predetermined E-business suite best practices. Various connectors, such as E-business suite connectors, are generated and exposed as web services via the connector generation system 26, which may be built on top of existing E-business adapters and AIA artifact generators.

While in the present embodiment, the connector repository-control module 22 is shown separately from the integration connector repository 30, note that the integration connector repository 30 and the repository-control module 22 may be considered as part of a single module or repository system without departing from the scope of the present teachings. In general, various modules discussed herein may be combined or implemented in a distributed fashion without departing from the scope of the present teachings.

The integration connector repository 30 includes pre-built connectors included in the suite 14 and may further include connectors generated by the connector generation system 26. A dynamic introspection system, which may be included as a user interface module of the user interface software 34, may detect all custom written or extended E-Business suite adapters. For the purposes of the present discussion, an introspection system may be any system or module that is adapted to determine one or more characteristics of a connector and/or adapter.

Users can use the user interface software 34 and hardware 36 to browse and search the repository 30 based on what (e.g., what object), when (e.g., when event happens), and how (e.g., how data should be used). Note that a connector, such as an E-business suite connector, may include a collection of E-business suite adapters that work together to achieve a specific integration function.

In general, for the purposes of the present discussion, an integration adapter may be a software program or other set of computer-readable instructions for facilitating communication between a first application and a second application for a particular task, such as retrieval of particular data or performance of a certain process. Hence, an adapter may facilitate two-way communication between applications. Adapters can be specific to particular applications or classes of applications. Various technologies, such as message queues, web services, or proprietary protocols may be used to facilitate implementing adapters. A connector may be any collection of adapters that work together to achieve a specific integration function, which may involve a series of tasks, also called a flow, handled by different adapters. Connectors that only employ one adapter are also considered to be adapters.

The connector monitor 28 is adapted to maintain runtime information for connectors. The runtime information may be collected from the middleware 18 and accompanying SOA server and from the database 16 and accompanying database server. The connector monitor 28, in combination with the user interface software 34, is adapted to enable a user to monitor not just the runtime performance of a given connector but the performance and runtime information of individual adapter services used by a connector.

The feedback module 24, which may also be called the E-business suite connector feedback system in the present embodiment, facilitates enabling a user (via the user interface software 34) to rate the usefulness of a connector and to share feedback and suggestions about each connector. The feedback may be provided back to the integration repository 30 via the connector generation system 26 or via a more direct link. The feedback may be viewed by different solution providers through the user interface software 34. Note that while the feedback log that maintains user feedback is contained in the feedback module 24 in the present embodiment, this feedback log may be located elsewhere, such as in the integration connector repository 30 without departing from the scope of the present teachings.

Note that various adapters and connectors, such as those included in the integration repository 30 may include machine-readable instructions for converting specific types of messages provided by different software applications into generic messages. Adapters may then convert the generic messages, e.g., Application Integration Architecture (AIA) format messages, into appropriate specific messages (e.g., E-business application-specific messages) as needed for use by particular applications.

Figure 2:
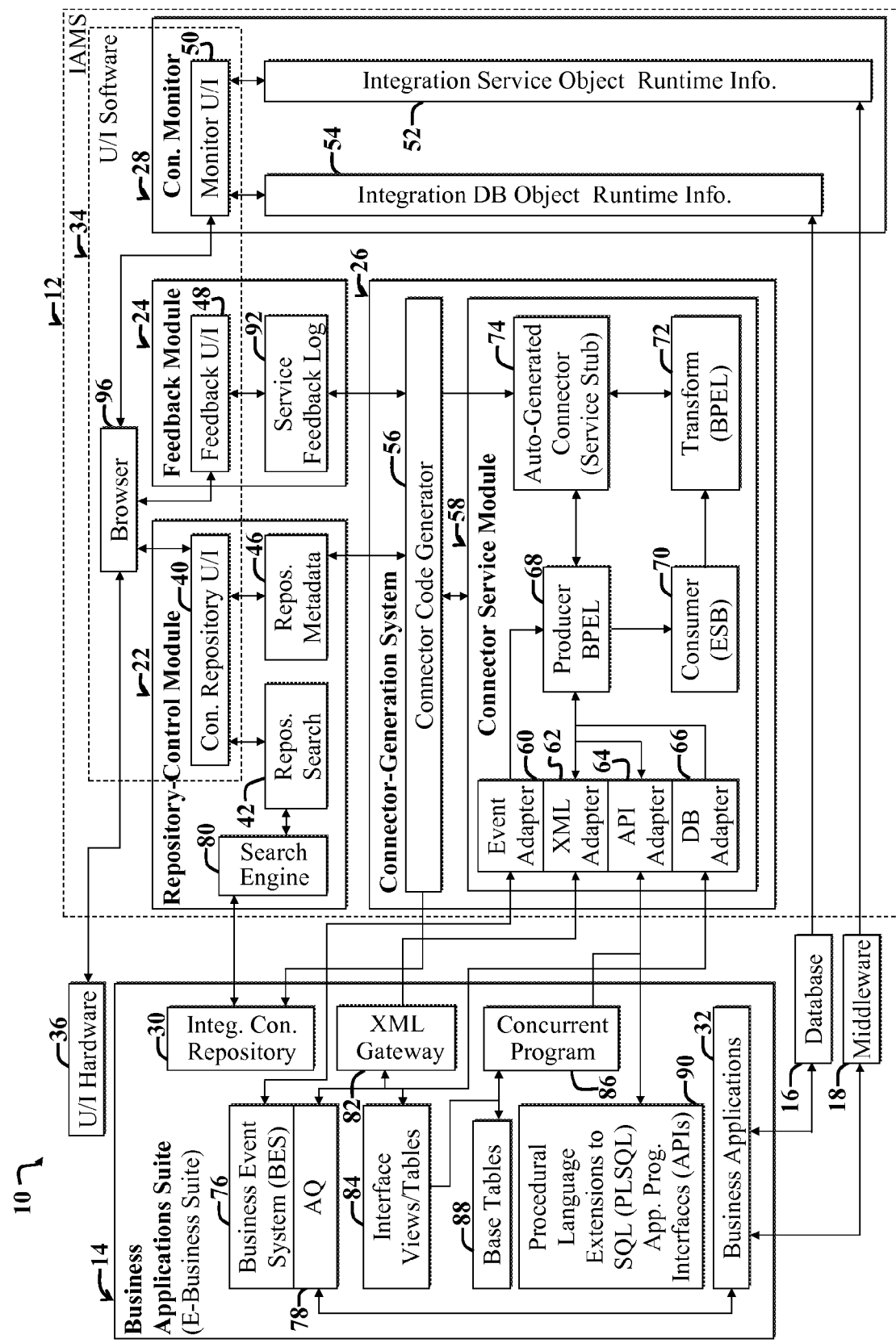
FIG. 2 is a more detailed diagram of the example system of FIG. 1.

FIG. 2 is a more detailed diagram of the example system 10 of FIG. 1. The user interface software 34 is shown including a browser interface 96 in communication with a connector repository user interface module 40, a connector feedback user interface module 48, and a connector monitor user interface module 50, which for illustrative purposes, are also shown included in the repository-control module 22, feedback module 24, and connector monitor module 28, respectively. The browser interface 96 includes machine-readable instructions for enabling a user to selectively access interface functionality provided by the other interface modules 40, 48, 50.

The repository-control module 22 further includes a connector repository search module 42 in communication with a search engine 80. The search engine 80 communicates with the integration repository 30 and facilitates implementing connector and adapter searches in response to searches triggered via the connector repository user interface module 40.

The repository search module 42 also communicates with a connector metadata repository 46 in the repository-control module 22, which is also searchable via the connector repository user interface module 40 and connector-repository search module 42. The connector metadata repository 46 further communicates with the connector repository user interface module 40. A user may employ the connector repository user interface module 40 to view, browse, and/or search contents of the metadata repository 46 and to add metadata pertaining to a given connector and/or adapter. For the purposes of the present discussion, connector metadata may be any information characterizing or describing a connector or adapter, including, but not limited to commands, parameters, flows, and timing or synchronization information associated therewith.

The feedback module 24 further includes a service feedback log 92 for maintaining user feedback pertaining to connector and/or adapter services used by applications, such as applications of the suite of software applications 14. The feedback may include connector ratings in accordance with a predetermined rating scale. In addition, feedback information maintained by the service feedback log 92 may indicate whether a given connector is missing functionality, whether it is being implemented appropriately, what functionality needs to be added to the connector, and so on. The service feedback log 92 communicates with the connector feedback module 48 and a connector code generator 56 of the connector generation system 26.

In an example operative scenario, suppose a person (user) searching for connectors is a solution provider for a particular company, e.g., Walmart, and the user is searching for invoice connectors, i.e., connectors for facilitating sharing invoice information among the business applications 32. The user may view connector feedback information maintained by the log 92 to help determine a preferred invoice connector to use for the particular application to be integrated.

The connector code generator 56 further communicates with the connector metadata repository 46. The connector code generator 56 may receive connector metadata from the metadata repository 46 to facilitate constructing one or more desired connectors and/or adapters in accordance with the metadata.

The connector generation system 26 further includes a connector service module 58 in communication with the connector code generator 56. Details of the connector service module 58 are application specific and may vary depending upon a particular implementation.

The connector service module 58 is adapted to expose (e.g., via the adapters 60-66) connectors generated by the connector code generator 56 as web services for use by the applications suite 14 and accompanying business applications 32. In the present specific embodiment, the connector service module 58 makes use of various existing technologies and tools to expose generated connectors 74 as web services to different applications. The technologies include an event adapter 60, an eXtensible Markup Language (XML) adapter 62, an Application Programming Interface (API) adapter 64, and a DataBase (DB) adapter 66. The adapters 60-66 communicate with a producer Business Process Execution Language (BPEL) Process Management (PM) module 68, which provides output (e.g., Application Business Message (ABM) output) to a consumer Enterprise Service Bus (ESB) module 70. The consumer ESB module 70 communicates with a transform BPEL PM module 72.

The producer BPEL PM module 68 facilitates constructing producer web-service adapters for a given connector. In the present example embodiment, producer adapters are used to convert messages generated by a producer application to generic Application Integration Architecture (AIA) messages and vice versa. Similarly, consumer adapters may convert messages from a consumer application to AIA messages and vice versa. In general, BPEL may be used join or integrate various disparate functions or processes into an integrated process or flow. BPEL may facilitate seamless use of the Internet and/or other networks to facilitate conducting business transactions, such as money exchanges, asset reallocation, and so on.

The transform BPEL module 72 facilitates generating a transform service linking producer services associated with producer adapters to consumer services associated with consumer adapters. The resulting orchestrated connector service is then characterized via metadata, which is stored in the metadata repository 46. The connector service and accompanying metadata are then used by producer and consumer applications of the suite 14 as needed. The connector services offered by the connector service module 58 may be activated in response to an event, such as a Uniform Resource Locator (URL) call from an application of the suite 14.

For illustrative purposes, various adapters 60-66 of the connector service module 58 are shown communicating with corresponding integration technologies included in the suite of applications 14. Example technologies include a Business Event System (BES) 76 and accompanying Advanced Queue (AQ) 78, which communicates with the event adapter 60 of the connector service module 58. An XML gateway 82 interfaces the XML adapter 62 with the BES 76 and an interface views/tables module 84. The BES 76 is shown in communication with the applications 32 of the suite 14. Note that the applications 32 may include various Enterprise Resource Planning (ERP) applications, such as Customer Relationship Management (CRM), Supply Chain Management (SCM), and so on, as may be included, for example, in an E-business suite of applications. The BES 76 includes machine-readable instructions that facilitate detecting events issued by one or more of the applications 32. The events may correspond to issued messages for which a connector service is desired to facilitate translation of the messages, as discussed more fully below.

The BES 76 may be implemented via an application service employing Advanced Queuing (AQ) technology to communicate business events between systems and applications. The BES 76 is adapted to support and facilitate message-based point-to-point system integration, system integration messaging hubs, and distributed applications messaging.

The API adapter 64 communicates with a Procedural Language extensions to Structured Query Language (PLSQL) Application Programming Interface (API) module 90 and a concurrent program module 86. The concurrent program module 86 communicates with base tables 88 and the interface views/tables module 84. The DB adapter 66 communicates with the interface views/tables module 84 and the AQ module 78 of the BES module 76.

When an application, such as a consumer application calls (such as via a URL) a connector service provided by the connector service module 58, the associated connector is run. The running of the connector service facilitates interfacing the consumer application with the producer application by converting messages. Runtime information pertaining to the connector is collected by the database 16 and middleware 18. An integration DB object runtime module 54 included in the connector monitor module 28 organizes and maintains connector runtime information obtained from the database 16. The maintained DB connector runtime information is then accessible via a connector monitor user interface module 50. Similarly, connector runtime information obtained by the middleware 18 is accessible via an integration service object runtime module 52 included in the connector monitor module 28. The integration services object runtime module 52 communicates with the connector monitor user interface module 50 to facilitate user access and viewing of connector runtime information organized and maintained thereby.

The metadata repository 46 may include connector information, e.g., what flow, command, parameter, and other relevant information for generating a particular connector. An example, connector might be "create order," "update order information," "cancel order," "create customer record," "update customer record," and so on. Each connector translates between a generic type message to an application-specific message to facilitate implementing the connector and sharing functionality and/or data between applications. In the example scenario where the connector is a "create order" connector for sharing order information between applications, note that one database may have a different organization for order information than another database. The connector facilitates mapping between the different order data structures.

Before a user codes a new connector for a particular integration task, the user may readily employ the repository-control module 22 to search the integration repository 30 and connector metadata repository 46 for suitable connectors. This helps to avoid redundant creation of connectors.

In summary, the system 10 may be considered an integration adapter management system that includes a repository of connectors 30; a connector generation system 26; a repository-control module 22 in communication with the connector generation system 26 and the integration repository 30; a feedback module 24 in communication with the connector generation system 26; a connector monitor 28 in communication with one or more applications to be integrated, wherein the one or more applications are adapted to use one or more connectors of the connector repository 30 to facilitate interconnectivity of the one or more applications 32 with one or more other applications; and one or more user interface modules 40, 48, 50, 96 in communication with the repository-control module 22, the feedback module 24, and the connector monitor module 28.

Note that the connector service module 58 may include machine-readable instructions adapted to employ one or more adapters to create a connector, wherein functionality associated with the connector is implemented via a web service. The middleware 18 may be implemented via a Service Oriented Architecture (SOA) server, wherein the SOA server hosts the middleware 18.

An example operation of the system 10 is discussed more fully below with reference to the example process flow of FIG. 3.

Figures 1, 3:
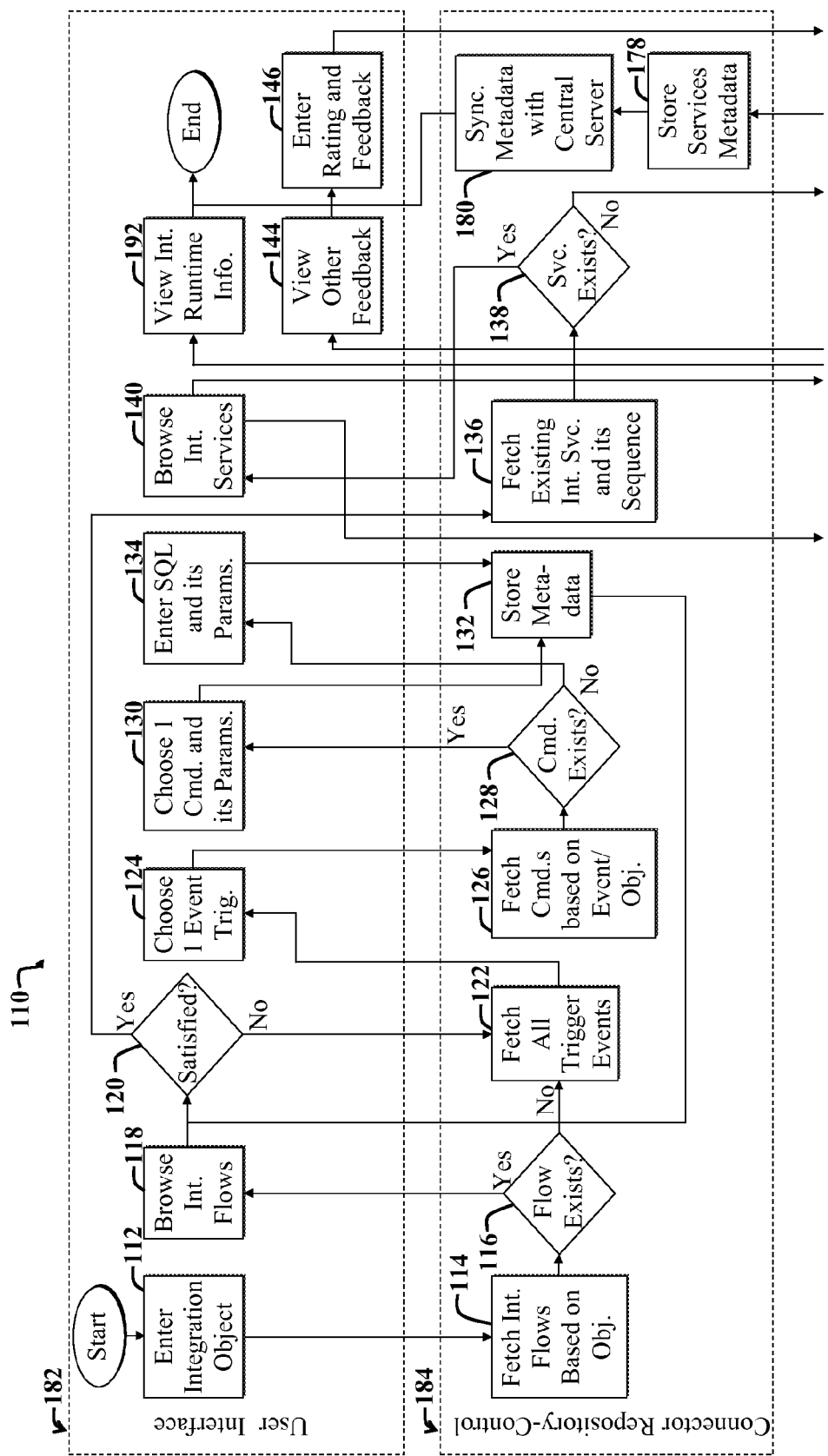
FIG. 3 is a flow diagram of an example process flow characterizing the system of FIGS. 1-2.
Figures 2, 3:
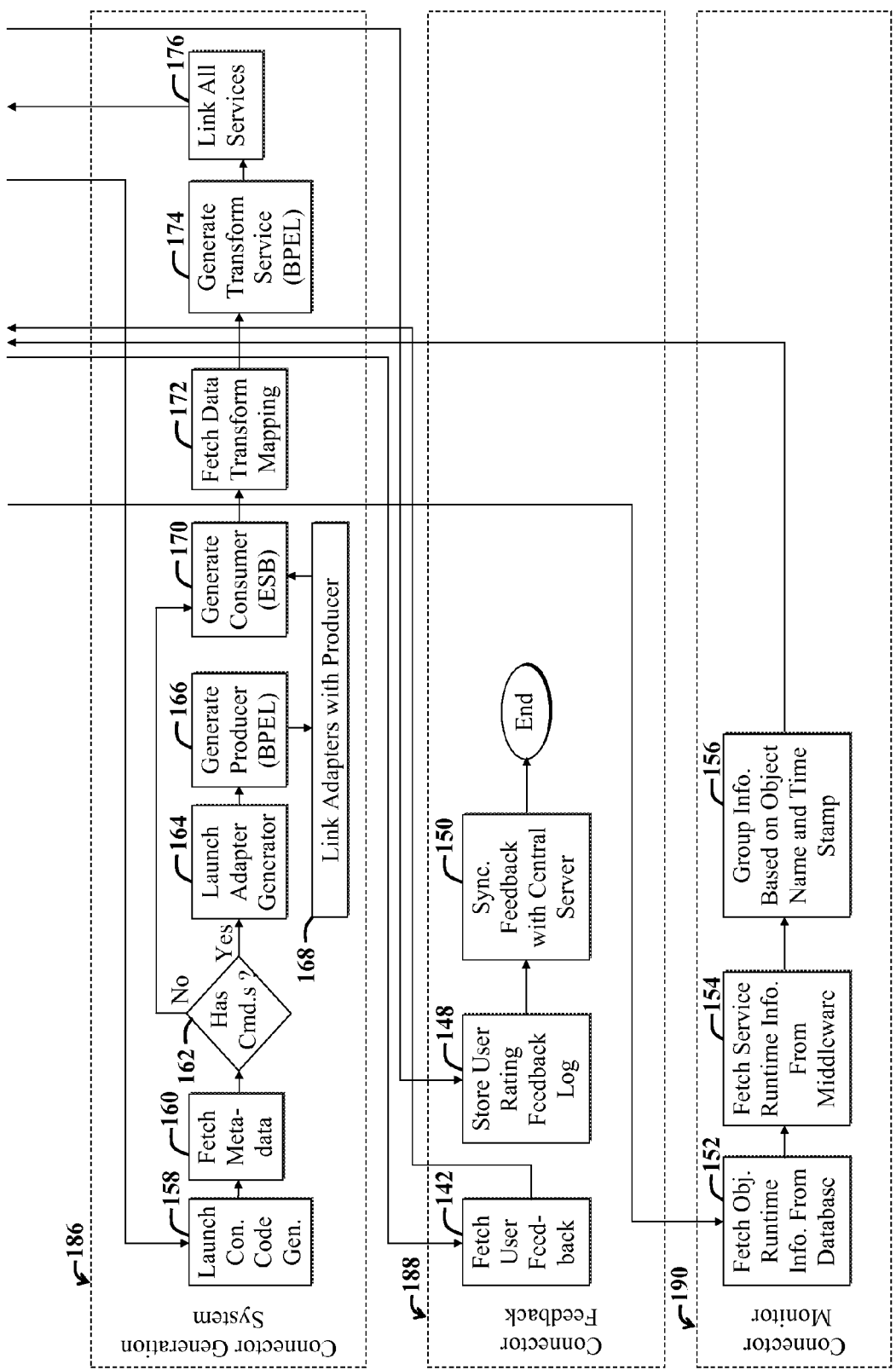

FIG. 3 is a flow diagram of an example process flow 110 characterizing the system 10 of FIGS. 1-2. The process flow 110 is divided into five sections 182-190 corresponding to user actions 182, connector repository actions 184, connector generation actions 186, connector feedback actions 188, and connector monitor actions 190.

With reference to FIGS. 2 and 3, generally, the user actions 182 correspond to a user selectively activating functionality of the connector repository user interface module 40, the connector feedback user interface module 48, and the connector monitor user interface module 50.

The example process flow 110 begins when an integration object is entered at an initial integration-object step 112. In the present embodiment, the integration object is entered by a user. However, in certain implementations, an integration object may automatically be entered in response to an event detection, such as by the BES 76 of the suite 14 of FIG. 1.

For the purposes of the present discussion, an integration object may be any programming language structure, such as a class, JavaBean, or other structure that encapsulates data and/or functionality affecting interaction of a first software application with a second software application. In general, integration objects may be used to encapsulate other integration objects and may include various commands or functions (also called methods) and parameters associated therewith. An integration object may correspond to a particular connector.

After an integration object or description thereof is entered, such as via the connector repository user interface module 40 of FIG. 2, the repository-control module 22 uses the entered integration object information to fetch integration flows associated with the object. The flows may be fetched from the integration repository 30 or the connector repository metadata module 46 of FIG. 2 at an integration-flow-fetching step 114 of FIG. 3.

If a flow corresponding to the integration object is not found in a subsequent flow-checking step 116, then all associated trigger events are fetched. Otherwise if a flow exists and has been found, then a user browses the integration flows (e.g., via the connector repository user interface module 40 of FIG. 2) at a flow-browsing step 118. If the user is satisfied with the integration flow, as determined at a satisfaction-checking step 120, then the associated integration service and its sequence are retrieved in an integration-service fetching step 136. If the user is not satisfied with the integration flow or no integration flow was found, the all trigger events are fetched at a trigger-event-fetching step 122.

After trigger events are fetched via the connector repository-control module 22 of FIG. 2, then the user chooses an event trigger in a trigger-choosing step 124. A subsequent command-fetching step 126 includes fetching commands for the event trigger based on the event and associated integration object.

A subsequent command-checking step 128 involves checking if commands were successfully fetched in the command-fetching step 126. If commands were not found or do not exist, then metadata pertaining to the integration object is stored in a metadata-storing step 132. In addition, in an optional manual-coding step 134, the user enters any desired SQL code and accompanying parameters for the connector associated with the entered integration object. After the user enters any desired SQL code and parameters in the manual-coding step 134, then any additional metadata describing the SQL code is stored via the metadata-storing step 132.

After completion of the metadata-storing step 132, the process flow returns to the satisfaction-checking step 120. If the user is not satisfied, then steps 122-134 repeat. Otherwise, the integration-service fetching step 136 is performed, followed by a service-existence-checking step 138. If the repository-control module 22 of FIG. 2 is able to successfully fetch an integration service and associated command sequence associated with the entered integration object as verified at the service-existence-checking step 138 then an integration-services-browsing step 140 is performed. Otherwise, the connector generation system 26 of FIG. 2 is activated for performing the corresponding group of connector generation actions 186.

If a service for implementing the desired connector does not exist, the code generator 56 of FIG. 2 is launched at a generator-launching step 158. Subsequently, any existing connector metadata is fetched at a metadata-fetching step 160. If the fetched connector metadata includes commands, as verified at a command-checking step 162, then an adapter generator is launched at adapter-generator-launching step 164. The adapter-generator-launching step 164 involves launching portions of the connector code generator 56 used for generating adapters and portions of the connector service module 58 for converting adapters and connectors to services.

Subsequently, a producer-generating step 166 is performed, whereby producer adapters are generated for exposure as services. For example, the producer adapters may include adapters for converting messages input and output to/from a producer application from/to a generic message to a specific message used by the producer application and vice versa.

After appropriate producer adapters are generated and implemented as services, such as by the producer BPEL module 68 of FIG. 2, and by middleware, such as the middleware 18 of FIG. 2, then appropriate adapters are linked with a particular producer application, thereby forming a connector. The linking performed at a producer-adapter-linking step 168 may involve linking an adapter generated for a producer, and then linking a link-adapter provided by middleware with the other linked adapters generated by the producer BPEL 68 of FIG. 2.

Subsequently, a consumer-generating step 170 is performed. The consumer-generating step 170 is reached after producer adapters and any middleware-generated adapters have been linked at the producer-adapter-linking step 168, or after the command-checking step 162 determines that the connector to be generated lacks commands. The consumer-generating step 170 involves generating a connector adapter and exposing the adapter as a service, such as via the consumer ESB module 70 of FIG. 2.

Subsequently, any data transform mappings are retrieved at a transform-mapping-fetching step 172. A transform mapping involves instructions for transferring data from one application to another, which may use different types of messages. The fetched transform mapping is then converted to a service at a transform-service-generating step 174. The transform-service-generating step 174 may employ the transform BPEL module 72 of FIG. 2 to facilitate converting a transform mapping to a transform service. Subsequently, a service-linking step 176 is performed, whereby all generated services are appropriately linked together in a connector service. Subsequently, a metadata-storing step 178 includes storing metadata associated with the linked services and accompanying connector. Connector metadata information stored, such as at the metadata repository 46 of the integration adapters management system 12 of FIG. 1 may be periodically or automatically synchronized with corresponding metadata stored in the integration repository 30 or metadata stored elsewhere.

During the integration-services-browsing step 140 of the user actions 182, the user may decide to browse connector runtime information, thereby selectively activating the connector-monitoring actions 190. In this case, runtime information pertaining to an integration object associated with a desired connector is retrieved from a database, such as the database 16 of FIG. 2. In addition, any runtime information associated with any services associated with the connector is retrieved from middleware, such as the middleware 18 of FIG. 2. In a subsequent information-grouping step 156, retrieved runtime information is then grouped for use in accordance with the name of the object associated with the connector and any time stamps specifying when the connector service and associated object were run. The grouped runtime information is then viewed by a user in a runtime-viewing step 192.

During the integration-services-browsing step 140 of the user actions 182, the user may decide to browse connector feedback information and/or to supply connector feedback information. In this case, a feedback-fetching step 142 is performed. The feedback-fetching step 142 involves retrieving or accessing feedback information from the feedback log 92 of FIG. 2 for use by the connector feedback user interface module 48.

Note that various steps grouped with the user actions 182 are performed or initiated by the user in the present embodiment. However, one of more of such steps may be performed automatically by software, such as software running on the suite 14 and/or integration adapters management system 12 of FIG. 2, without departing from the scope of the present teachings.

Subsequently, an optional feedback-viewing step 144 may be performed. The feedback-viewing step 144 involves viewing contents of the feedback retrieved in the previous feedback-fetching step 142.

Next, an optional feedback-entering step 146 may be performed. The feedback-entering step 146 includes entering a rating for a particular connector, adapter, and/or accompanying service. Next, a feedback-storing step 148 includes storing the entered feedback information in the service feedback log 92 of FIG. 2. The feedback log 92 of FIG. 2 is optionally synchronized with one or more entities in an accompanying enterprise, such as a central enterprise application server or other server running the suit 14 of FIG. 2.

Figure 4:
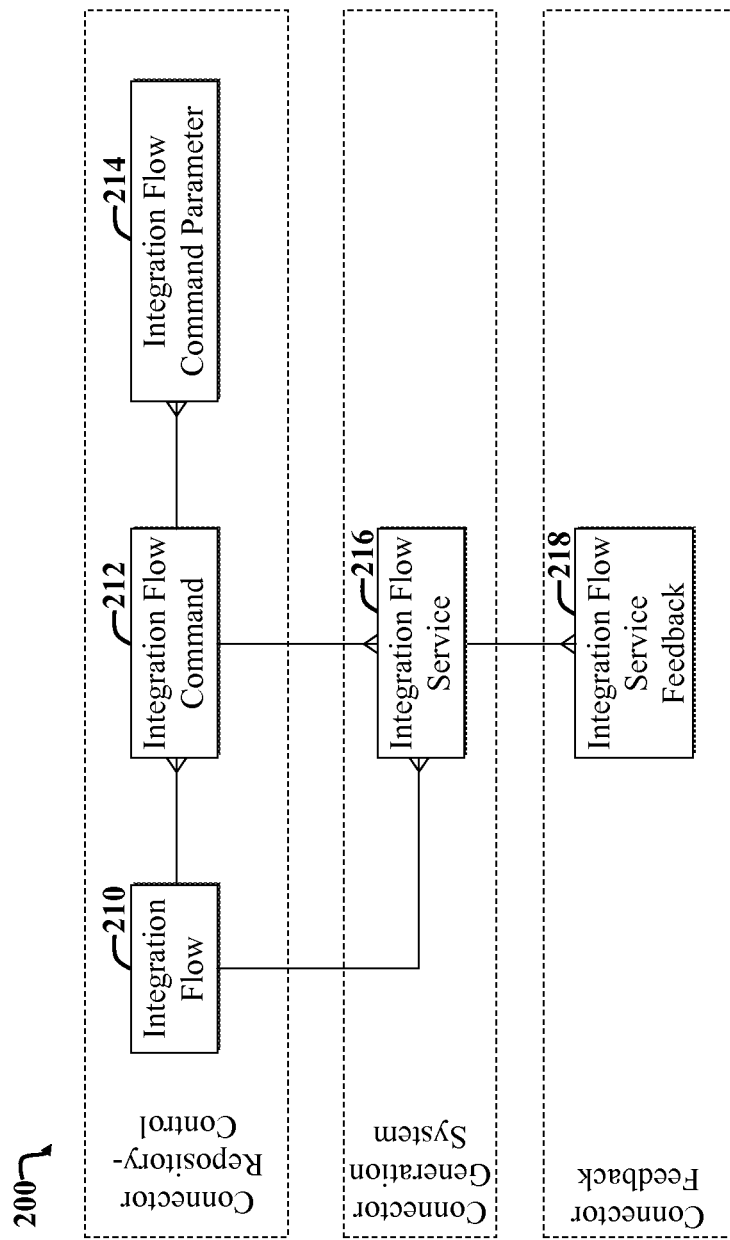
FIG. 4 an example Entity Relationship (ER) diagram depicting example relationships between a connector process flow and associated commands, parameters, services, and feedback processes characterizing the system of FIGS. 1-2.

FIG. 4 an example Entity Relationship (ER) diagram depicting example relationships 200 between a connector process flow 210 and associated commands 212, parameters 214, services 216, and feedback processes 218 characterizing the system 10 of FIGS. 1-2.

With reference to FIGS. 2 and 4, a given flow 210, as maintained in the integration repository 30 and the metadata repository 46 of FIG. 2, may include multiple connectors and adapters, which may be associated with plural commands 212. Each command 212 may have plural command parameters 214. The connector generation system 26 of FIG. 2 may create one or more services for each flow 210 and accompanying command(s) 212. The feedback module 24 of FIG. 2 facilitates receiving user feedback, such as connector service ratings, where each connector service, also called a flow service, may be associated with plural instances of user feedback 218.

A couple of example flows are specified in the following table:

TABLE 1

| (Flow) | | | | |
|---|---|---|---|---|
| Flow ID | Object Name | Object Table Name | Outbound (Share Changes Among Apps.) | Type |
| 1 | Supplier | AP_Suppliers_All | Yes | AsyncRT |
| 2 | Currency Exchange Rate | GL_Currency_Daily_Rate | Yes | AsyncBatch |

Table 1 above identifies two flows, including an example supplier flow (Flow ID=1) and an example currency exchange rate flow (Flow ID=2). The first flow uses a supplier object, the contents of which are maintained in a table called AP_Suppliers_All. The second flow uses a currency exchange rate object, the contents of which are maintained in a table called GL_Currency_Daily_Rate. Both flows are configured to share updates and changes, i.e., provide outbound information, accessible by other integrated applications, not just the application invoking the service(s) associated with the flows. Both flows are asynchronous type flows to be implemented via asynchronous services. For the purposes of the present discussion, an asynchronous service may be any web service that runs independently from a calling service, such that when such a service is called by an application, the service may continue to run despite the status of the calling application.

Three example commands are specified in the following Table 2:

TABLE 2

| (Command) | | | | | | |
|---|---|---|---|---|---|---|
| Cmd. ID | Flow ID | Trigger | Event | Cmd. Name | API | SQL |
| 1 | 1 | Update/Create | apps.ap.supplier.event | Query | AP_Supplier_info_Pkg.Supplier_Details | |

TABLE 2-continued (Command)

| Cmd. ID | Flow ID | Trigger | Event | Cmd. Name | API | SQL |
|---|---|---|---|---|---|---|
| 2 | 1 | Manual | | Query | | SELECT* FROM(...)... |
| 3 | 2 | Update/ Create | apps.gl. CurrencyConvRates. dailyRates. specify | Query | Get_Cur_Conv_Rates | |

Table 2 above illustrates, for example, that the first flow (supplier) of table 1 (Flow ID=1) can be triggered in response to detection of an update event and/or a create trigger associated with a supplier event, or the flow can be manually triggered not necessarily in response to a detected event. The first flow can also be manually triggered, whereby user-supplied SQL statements are executed rather than an API for implementation of the associated command. Similarly, the currency exchange rate flow (Flow ID=2) can be triggered in response to an update and/or create trigger.

The three commands (Command Ids 1-3) are called query commands, since supplier information and/or currency conversion rate information is queried to implement the associated command. For example, the first command employs an API called AP_Supplier_info_Pkg.Supplier_Details to retrieve supplier details. Similarly, the third command employs an API called Get_Cur_Conv_Rates to retrieve currency conversion rates from a producer application.

Nine example parameters are specified in the following example Table 3:

TABLE 3

(Parameter)

| Param. ID | Cmd. ID | Data Type | Parameter Name | Param. Type |
|---|---|---|---|---|
| 1 | 1 | Number | Vendor_Id | In |
| 2 | 1 | Number | Vendor_Site_Id | In |
| 3 | 1 | Number | Vendor_Contact_Id | In |
| 4 | 1 | Object | AP_SUPPLIER_INFO_PKG.Supplier_Tbl | Out |
| 5 | 2 | Number | From_Vendor_Id | In |
| 6 | 2 | Number | To_Vendor_Id | In |
| 7 | 3 | Date | From_Date | In |
| 8 | 3 | Date | To_Date | In |
| 9 | 3 | Object | GL_Array_Cur_Conv_Rates | Out |

Table 3 illustrates, for example, that each command can be associated with multiple different parameters. The first command (command ID=1) uses parameters 1-4; the second command uses parameters 5 and 6; while the third command uses parameters 7-9. Parameters whose values are received as input are specified as type "in," while parameters that are output from the associated service.

Example services generated by the connector generation system 26 of FIG. 2, which are to be linked into a given connector, are illustrated in Table 4 below:

TABLE 4

(Service)

| Svc. ID | Flow ID | Cmd. ID | Seq. No. | Svc. Type | Svc. Name | Ver. | Modified | File Loc. |
|---|---|---|---|---|---|---|---|---|
| 2 | 1 | 1 | 1 | BPEL | SupplierPartyListEBizAdapter | 1 | 9/09 | /usr/. |
| 3 | 1 | 1 | 2 | BPEL | SupplierPartyListEBizJMSProducer | 1 | 9/09 | /usr/. |
| 4 | 1 | | 3 | ESB | SupplierPartyListEBizJMSConsumer | 1 | 9/09 | /usr/. |
| 5 | 1 | | 4 | BPEL | SyncSupplierPartyListEBizReqABCSimpl | 1 | 9/09 | /usr/. |
| 1 | 1 | 2 | 1 | BPEL | InitialLoadSupplierPartyListEbizAdapter | 1 | 9/09 | /usr/. |
| 6 | 2 | 3 | 1 | BPEL | SupplierCurrencyExchangeEBizJMSProducer | 1 | 10/09 | /usr/. |

TABLE 4-continued (Service)

| Svc. ID | Flow ID | Cmd. ID | Seq. No. | Svc. Type | Svc. Name | Ver. | Mod-ified | File Loc. |
|---|---|---|---|---|---|---|---|---|
| 7 | 2 | | 2 | ESB | SupplierCurrencyExchangeEBizJMSConsumer | 1 | 10/09 | /usr/. |
| 8 | 2 | | 3 | BPEL | SyncCurrencyExchangeEbizReqABCSimpl | 2 | 10/09 | /usr/. |

Note that the sequence number indicates an order, i.e., timing at which individual services are to be activated when implementing the linked connector service that includes the various services listed in Table 4. Note that in the present embodiment, certain producer services are implemented via Business Process Execution Language (BPEL) functionality, while the consumer services are implemented via Enterprise Service Bus (ESB) functionality.

Figure 5:
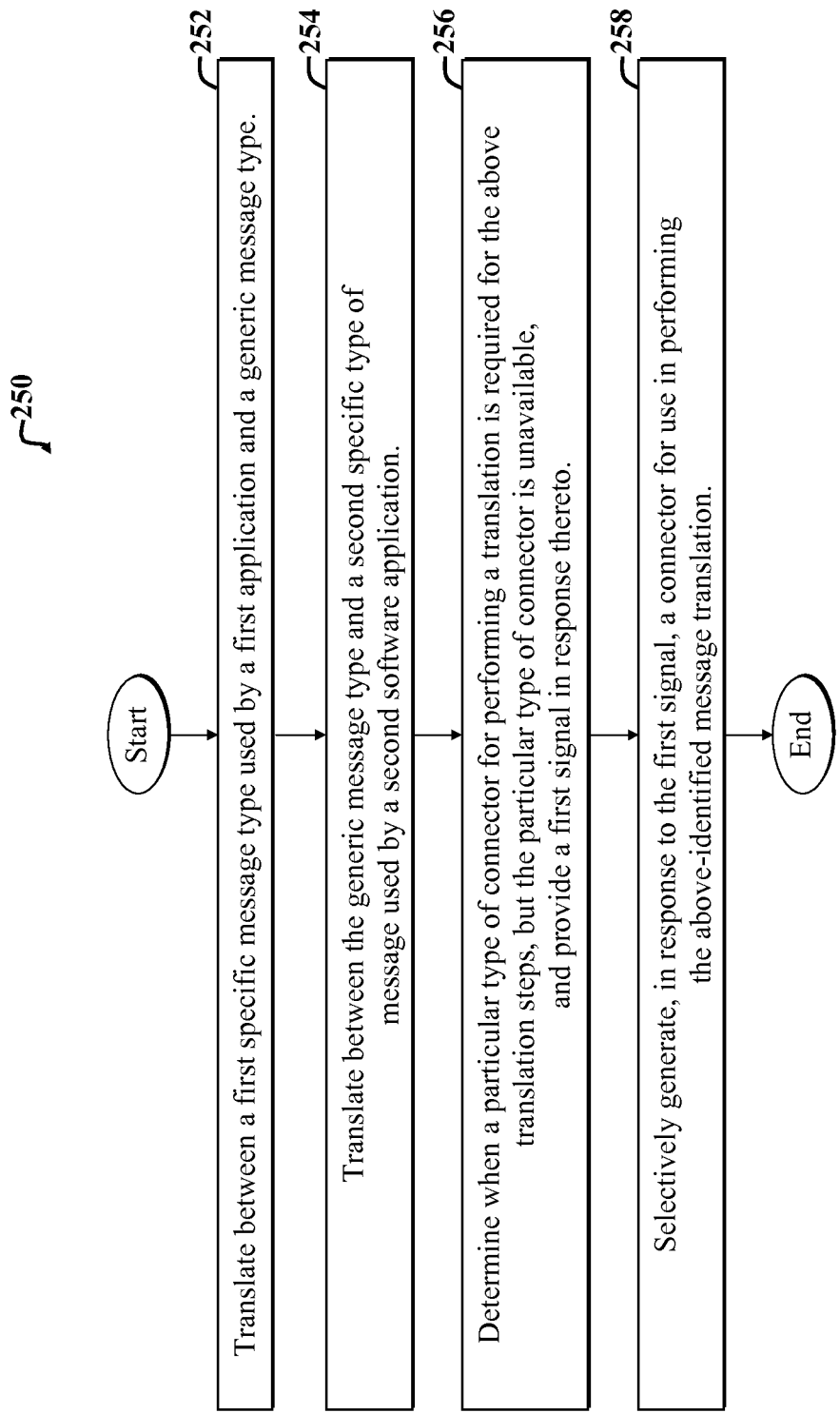
FIG. 5 is a flow diagram of an example generalized method that is adapted for use with the system of FIGS. 1-2.

FIG. 5 is a flow diagram of an example generalized method 250 that is adapted for use with the system 10 of FIGS. 1-2. The method 250 includes a first step 252, which involves translating between a first specific message type used by the first application and a generic message type, such as an AIA type message. Such a translation may be performed, for example, by a connector service generated by the connector service module 58 of FIG. 2. The first application may be, for example, an order-generating application running on the suit 14 and included in the applications 32 of FIG. 1.

A second step 254 includes translating between the generic message type and a second specific type of message used by a second software application. The second software application may be, for example, a database that maintains account information for a business that is initiating an order. Such a translation from a generic message type, such as an AIA message type to a specific type of message may be performed via a connector service implemented via the connector service module 58 of FIG. 2.

A third step 256 includes determining when a particular type of connector for performing a translation is required by the first step 254 or the second step 256, but the particular type of connector is unavailable, and providing a first signal in response thereto. The first signal may correspond, for example, to results of a search of the integration repository 30 of FIG. 2 implemented via the repository-control module 22 of FIG. 2.

A fourth step 258 includes selectively generating a connector for use in the first step 252 and/or the second step 254 in response to the first signal. The fourth step 258 may be implemented in part via the connector generation system 26 of FIG. 2.

Note that the various steps 252-258 of the method 250 may be changed without departing from the scope of the present teachings. For example, steps may be rearranged; steps may be added; and certain steps may be omitted. Additional example steps include facilitating collecting and storing feedback pertaining to performance of a given connector; searching a connector repository to find a given connector used for implementing the first step 252 and/or the second step 254; referencing feedback data pertaining to a connector of the connector repository to facilitate determining a connector to provide to use for the first step 252 and/or the second step 254; and tracking runtime information associated with execution of a connector used in the first step 252 and/or second step 254.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a computer, for managing integration adapters used to integrate software applications, the method comprising:

fetching, using the computer, a selected integration flow, associated with an integration object, from an integration connector repository if the selected information flow is stored in an integration connector repository, with the integration connector repository storing a plurality of integration flows, where an integration flow is a series of tasks handled by different integration adapters; or creating, using the computer, the selected integration flow by fetching all event triggers and commands for the event triggers if the selected integration flow is not stored in the integration connector repository;

fetching, using the computer, a selected integration service, including integration adapters and connectors that handle the series of tasks of the integration flow, from the integration connector repository if the selected integration service exists in the integration connector repository, where a connector is any collection of integration adapters that work together to achieve a specific integration function and that translate a first type of specific message from a first application into a generic message and then translate the generic message to a second type of specific message readable by a second application; or creating, using the computer, the selected integration service if the selected integration service does not exist in the integration connector repository by fetching connector metadata, generating integration adapters and connectors, converting adapters and connectors to services, and storing metadata related to generated adapters and connectors; and employing a connector generation system, a repository control module in communication with the connector generation system and the integration connector repository, a feedback module in communication with the connector generation system, a connector monitor in communication with one or more applications to be integrated, and one or more user interface modules in communication with the repository control module, the feedback module, and the connector monitor module to facilitate implementing the steps of creating and the steps of fetching.

2. The method of claim 1, further including monitoring, using the computer, runtime information associated with a connector and storing runtime information.

3. The method of claim 2, further including maintaining, using the computer, feedback information pertaining to operation of one or more connectors of the integration connector repository.

4. The method of claim 3, further including providing one or more interfaces to facilitate enabling a user to provide feedback pertaining to a connector and to view runtime information.

5. The method of claim 4, further including providing a search engine to facilitate enabling a user to employ one or more user interfaces to perform a search of the integration connector repository for a desired connector.

6. The method of claim 4, further including detecting, using the computer, custom or extended adapters in the integration connector repository and providing an indication in response thereto to one or more user interface modules.

7. The method of claim 3, further including implementing, using the computer, one or more generated connectors as a web service.

8. The method of claim 7, wherein implementing further includes implementing the one or more generated connectors in accordance with an Application Integration Architecture (AIA) integration framework.

9. The method of claim 1, further including detecting, using the computer, an event triggered by one or more of the software applications and providing a signal in response thereto.

10. The method of claim 9, further including providing a connector that is adapted to facilitate implementing a process associated with a detected event.

11. The method of claim 10, wherein providing a connector further includes employing a connector service module in communication with a connector code generator to facilitate providing the connector.

12. The method of claim 11, wherein the connector service module includes an event adapter.

13. The method of claim 1 with creating, using the computer, the selected integration service further including:

translating, using the computer, between a first specific message type used by a first application and a generic message type;

converting, using the computer, between the generic message type and a second specific type of message used by a second software application;

determining, using the computer, when a particular type of connector for performing a translation is required by the step of translating or the step of converting, but the particular type of connector is unavailable, and providing a first signal in response thereto; and selectively generating, using the computer, a connector for use by the step of translating or the step of converting in response to the first signal.

14. The method of claim 13, further including facilitating, using the computer, collecting and storing feedback pertaining to performance of a given connector used by the step of translating or the step of converting.

15. The method of claim 13, further including searching, using the computer, an integration connector repository to find a connector required by the step of translating or the step of converting.

16. The method of claim 15, further including referencing, using the computer, feedback data pertaining to a connector of the integration connector repository to facilitate determining a connector for use by the step of translating or the step of converting.

17. The method of claim 13, further including facilitating, using the computer, monitoring runtime information associated with execution of a connector used by the step of translating or the step of converting.

18. An apparatus for managing integration adapters used to integrate software applications, the apparatus comprising:

a digital processor coupled to a display and to a non-transitory processor-readable storage device, wherein the processor-readable storage device includes one or more instructions executable by the digital processor to perform the following acts:

fetching, using the computer, a selected integration flow, associated with an integration object, from an integration connector repository if the selected information flow is stored in an integration connector repository, with the integration connector repository storing a plurality of integration flows, where an integration flow is a series of tasks handled by different integration adapters; or creating, using the computer, the selected integration flow by fetching all event triggers and commands for the event triggers if the selected integration flow is not stored in the integration connector repository;

fetching, using the computer, a selected integration service, including integration adapters and connectors that handle the series of tasks of the integration flow, from the integration connector repository if the selected integration service exists in the integration connector repository, where a connector is any collection of integration adapters that work together to achieve a specific integration function and that translate a first type of specific message from a first application into a generic message and then translate the generic message to a second type of specific message readable by a second application; or creating, using the computer, the selected integration service if the selected integration service does not exist in the integration connector repository by fetching connector metadata, generating integration adapters and connectors, converting adapters and connectors to services, and storing metadata related to generated adapters and connectors; and employing a connector generation system, a repository control module in communication with the connector generation system and the integration connector repository, a feedback module in communication with the connector generation system, a connector monitor in communication with one or more applications to be integrated, and one or more user interface modules in communication with the repository control module, the feedback module, and the connector monitor module to facilitate implementing the steps of creating and the steps of fetching.

19. A non-transitory processor-readable storage device including instructions executable by a digital processor for managing integration adapters used to integrate software applications, the processor-readable storage device including one or more instructions for:

fetching, using the computer, a selected integration flow, associated with an integration object, from an integration connector repository if the selected information flow is stored in an integration connector repository, with the integration connector repository storing a plurality of integration flows, where an integration flow is a series of tasks handled by different integration adapters; or creating, using the computer, the selected integration flow by fetching all event triggers and commands for the event triggers if the selected integration flow is not stored in the integration connector repository;

fetching, using the computer, a selected integration service, including integration adapters and connectors that handle the series of tasks of the integration flow, from the integration connector repository if the selected integration service exists in the integration connector repository, where a connector is any collection of integration adapters that work together to achieve a specific integration function and that translate a first type of specific message from a first application into a generic message and then translate the generic message to a second type of specific message readable by a second application; or creating, using the computer, the selected integration service if the selected integration service does not exist in the integration connector repository by fetching connector metadata, generating integration adapters and connectors, converting adapters and connectors to services, and storing metadata related to generated adapters and connectors; and employing a connector generation system, a repository control module in communication with the connector generation system and the integration connector repository, a feedback module in communication with the connector generation system, a connector monitor in communication with one or more applications to be integrated, and one or more user interface modules in communication with the repository control module, the feedback module, and the connector monitor module to facilitate implementing the steps of creating and the steps of fetching.

\* \* \* \* \*

UNITED STATES PATENT AND TRADEMARK OFFICE
CERTIFICATE OF CORRECTION

Page 1 of 1

PATENT NO. : 8,443,374 B2
APPLICATION NO. : 12/877093
DATED : May 14, 2013
INVENTOR(S) : Li et al.

It is certified that error appears in the above-identified patent and that said Letters Patent is hereby corrected as shown below:

In the Drawings:

On sheet 3 of 6, in figure 3-1, Box No. 126, line 4, delete "Evcnt/" and insert -- Event/ --, therefor.

On sheet 4 of 6, in figure 3-2, Box No. 142, line 3-4, delete "Fccdback" and insert -- Feedback --, therefor.

On sheet 4 of 6, in figure 3-2, Box No. 148, line 3, delete "Fccdback" and insert -- Feedback --, therefor.

In the Specification:

In column 1, line 11, delete "purposes" and insert -- purposes. --, therefor.

Signed and Sealed this
Tenth Day of September, 2013

Teresa Stanek Rea
*Acting Director of the United States Patent and Trademark Office*